US009673869B2

United States Patent
Inoue

(10) Patent No.: US 9,673,869 B2
(45) Date of Patent: Jun. 6, 2017

(54) COMMUNICATION APPARATUS CONFIGURED TO PERFORM NON-CONTACT COMMUNICATION WITH EXTERNAL DEVICE

(71) Applicant: BROTHER KOGYO KABUSHIKI KAISHA, Nagoya-shi, Aichi-ken (JP)

(72) Inventor: Etsuteru Inoue, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 140 days.

(21) Appl. No.: 14/582,358

(22) Filed: Dec. 24, 2014

(65) Prior Publication Data

US 2015/0188609 A1    Jul. 2, 2015

(30) Foreign Application Priority Data

Dec. 27, 2013 (JP) ................... 2013-271984

(51) Int. Cl.
| | |
|---|---|
| *G06K 15/00* | (2006.01) |
| *H04B 5/00* | (2006.01) |
| *H04W 4/00* | (2009.01) |
| *H04W 52/02* | (2009.01) |
| *G06F 1/32* | (2006.01) |

(Continued)

(52) U.S. Cl.
CPC ......... *H04B 5/0037* (2013.01); *H04B 5/0031* (2013.01); *H04W 4/008* (2013.01); *H04W 52/0296* (2013.01); *G06F 1/3287* (2013.01); *H02J 1/10* (2013.01); *H04N 1/00888* (2013.01);

(Continued)

(58) Field of Classification Search
None
See application file for complete search history.

(56) References Cited

U.S. PATENT DOCUMENTS

2012/0005497 A1    1/2012  Tsukamoto et al.
2012/0311555 A1*  12/2012  Nijenkamp ............... G06F 8/65
                                                               717/170

(Continued)

FOREIGN PATENT DOCUMENTS

JP        2012-14422 A    1/2012

*Primary Examiner* — Miya J Williams
(74) *Attorney, Agent, or Firm* — Scully, Scott, Murphy & Presser, P.C.

(57) ABSTRACT

In response to receiving process-request information from an external device after starting operation by second power, a communication controller is configured to perform: a first supplying process of controlling a second power supply to supply the second power to a first communication node; a first data communication process of performing data communication with the first communication node after starting the first supplying process, wherein the first data communication process includes receiving process-related information from the first communication node; a determining process of, after finishing the first data communication process, determining whether data communication with a second communication node is necessary, based on the process-request information and on the process-related information; and a second supplying process of controlling the second power supply to supply the second power to the second communication node, in response to determining in the determining process that data communication with the second communication node is necessary.

20 Claims, 8 Drawing Sheets

(51) Int. Cl.
*H04N 1/00* (2006.01)
*H02J 1/10* (2006.01)

(52) U.S. Cl.
CPC ... *H04N 1/00904* (2013.01); *H04N 2201/006* (2013.01); *H04N 2201/0094* (2013.01)

(56) References Cited

U.S. PATENT DOCUMENTS

| | | | | |
|---|---|---|---|---|
| 2013/0229684 A1* | 9/2013 | Yasuzaki | ............ | H04N 1/00127 358/1.15 |
| 2015/0161421 A1* | 6/2015 | Lee | .................... | G06K 7/10217 340/10.5 |
| 2015/0189112 A1* | 7/2015 | Misumi | .............. | H04N 1/00888 358/1.14 |

* cited by examiner

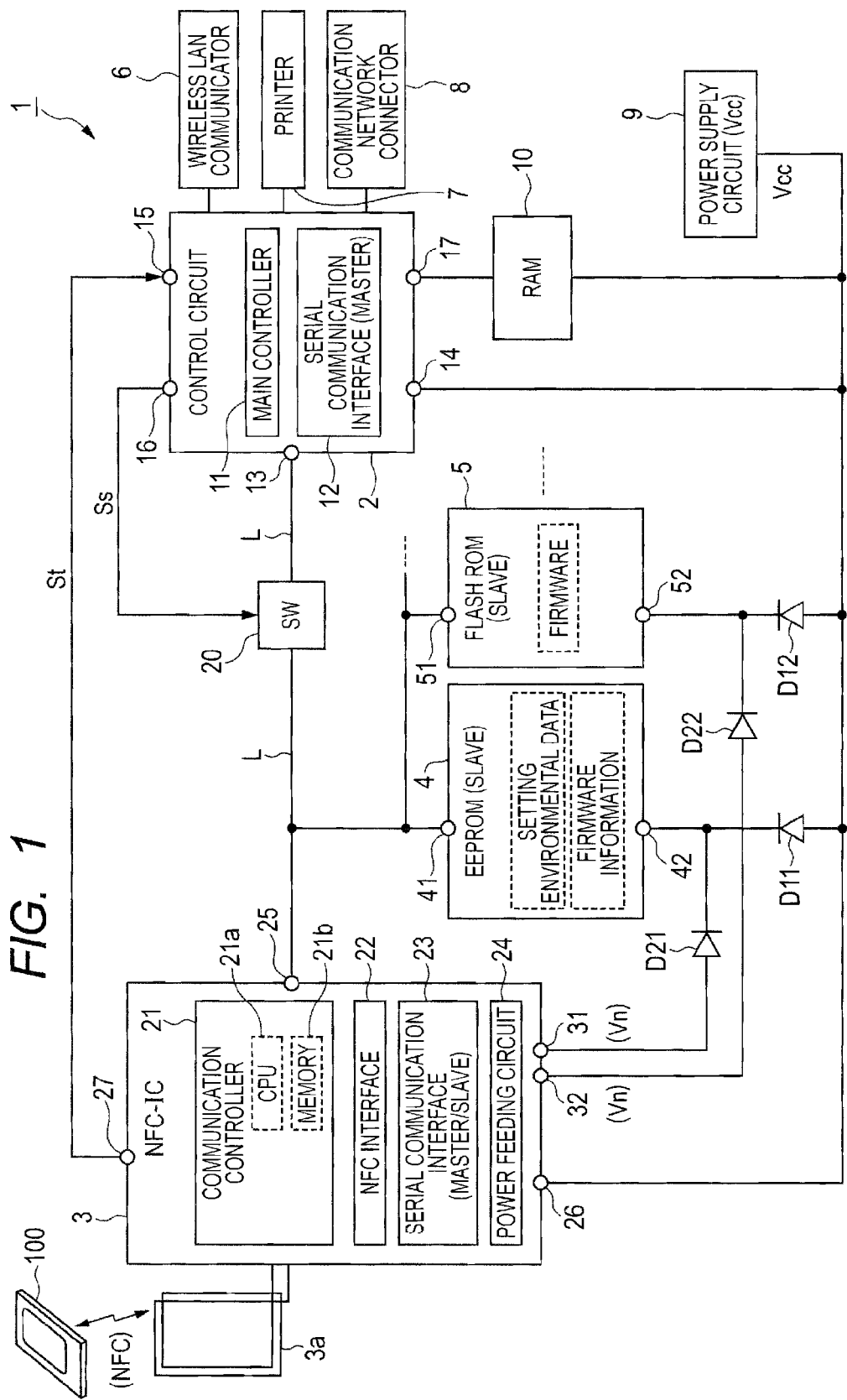

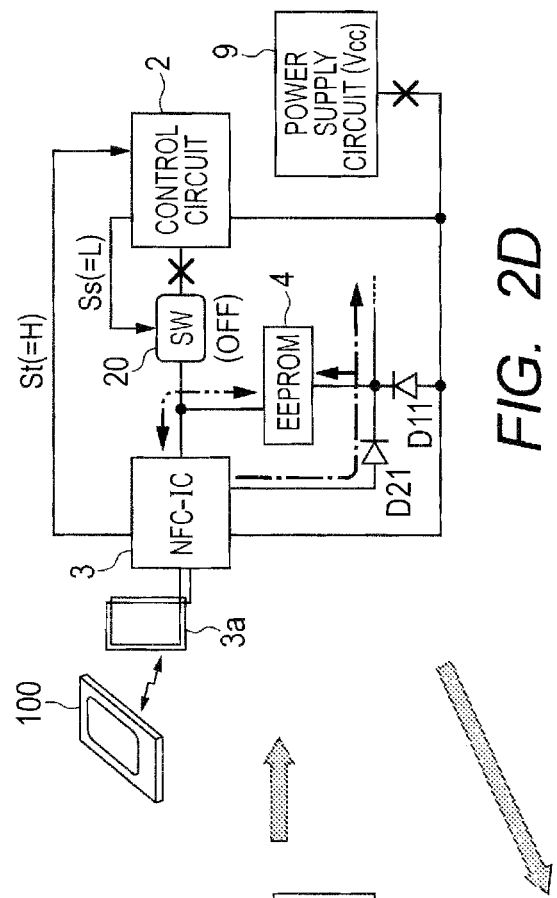
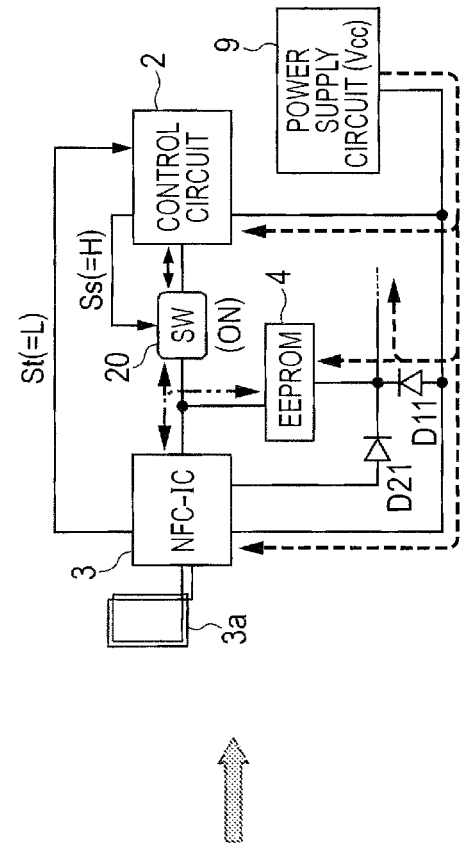
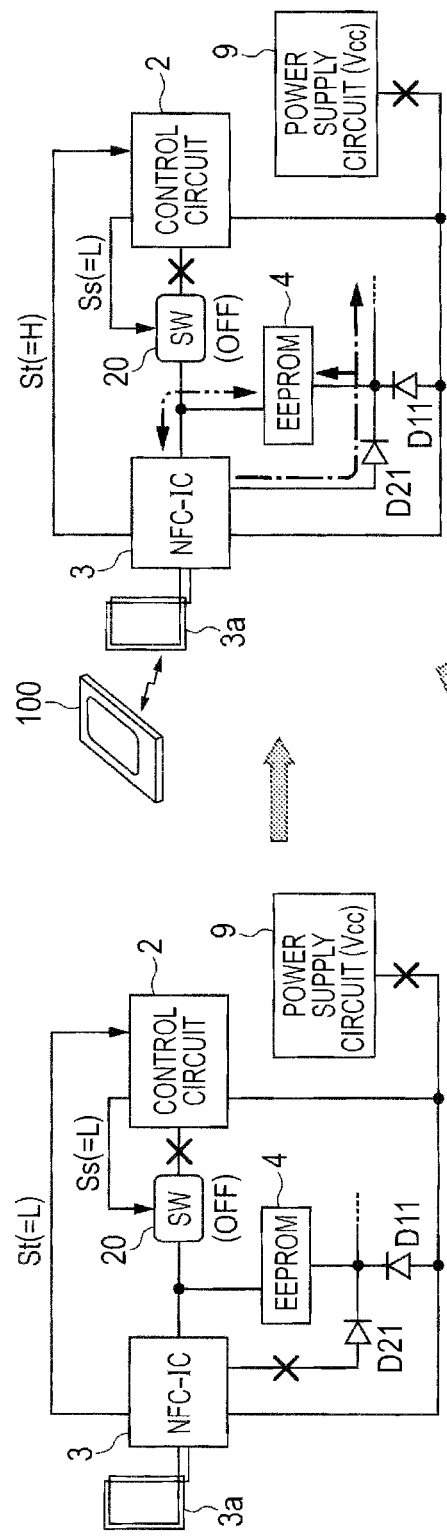
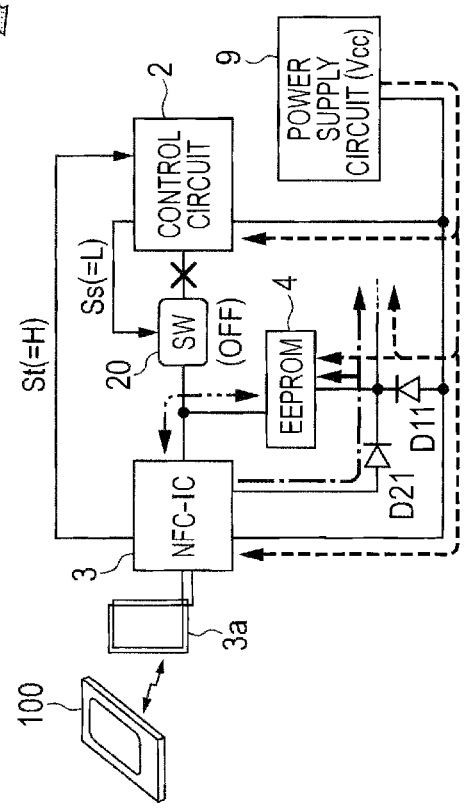

COMMUNICATION APPARATUS CONFIGURED TO PERFORM NON-CONTACT COMMUNICATION WITH EXTERNAL DEVICE

CROSS REFERENCE TO RELATED APPLICATIONS

This application claims priority from Japanese Patent Application No. 2013-271984 filed Dec. 27, 2013. The entire content of the priority application is incorporated herein by reference.

TECHNICAL FIELD

The invention relates to a communication apparatus that is configured to perform non-contact communication with an external device.

BACKGROUND

There are various communication apparatuses that are configured to perform non-contact communication with external devices. By using non-contact communication, for example, it is possible to access to a memory in a communication apparatus from an external device for reading or writing data, and to instruct a communication apparatus to perform a function from an external device. For example, NFC (Near Field Communication) is known as a non-contact communication method.

In these communication apparatuses, it is convenient if non-contact communication with an external device can be performed as necessary to access the memory and to instruct execution of a function, even in a state where power is turned off or a power plug is pulled out and hence a normal operation is stopped.

Technology is known that power is fed from an external device to a terminal device on which a battery is not mounted, by non-contact power feeding, so that the terminal device is started up as usual by the fed electric power for performing necessary processes.

SUMMARY

According to one aspect, the invention provides a communication apparatus. The communication apparatus includes a first power supply, an antenna, a second power supply, a communication controller, a main controller, and a plurality of communication nodes. The first power supply is configured to generate first power. The antenna is configured to perform non-contact communication with an external device. The second power supply is configured to generate second power based on electric power supplied from the external device via the antenna. The communication controller is configured to control non-contact communication with the external device via the antenna while at least one of the first power and the second power is supplied to the communication controller. The main controller is configured to control the communication apparatus to perform a function thereof while the first power is supplied to the main controller. The plurality of communication nodes is configured to operate while at least one of the first power and the second power is supplied to the plurality of communication node. The plurality of communication nodes includes a first communication node and a second communication node. In response to receiving process-request information from the external device after starting operation by the second power, the communication controller is configured to perform: a first supplying process of controlling the second power supply to supply the second power to the first communication node; a first data communication process of performing data communication with the first communication node after starting the first supplying process, wherein the first data communication process includes receiving process-related information from the first communication node; a determining process of after finishing the first data communication process, determining whether data communication with the second communication node is necessary, based on the process-request information and on the process-related information; and a second supplying process of controlling the second power supply to supply the second power to the second communication node, in response to determining in the determining process that data communication with the second communication node is necessary.

BRIEF DESCRIPTION OF THE DRAWINGS

Embodiments in accordance with the invention will be described in detail with reference to the following figures wherein:

FIG. 1 is an explanatory diagram showing the overall configuration of a multifunction peripheral according to embodiments;

FIGS. 2A through 2D are explanatory diagrams showing operational examples of the multifunction peripheral;

DETAILED DESCRIPTION

Figure 3:
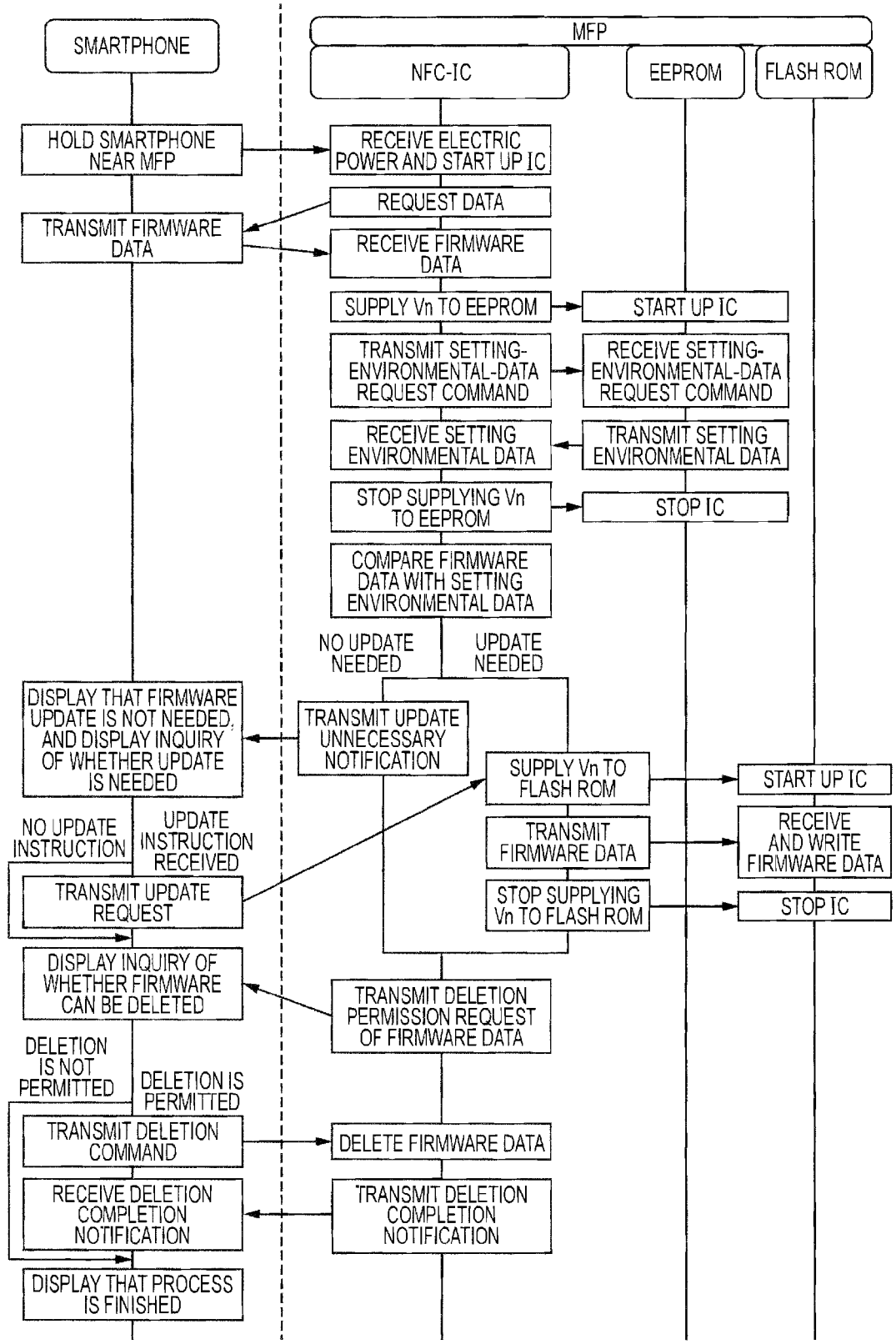
FIG. 3 is an explanatory diagram showing a firmware update procedure according to a first embodiment.

Some aspects of the invention will be described while referring to the accompanying drawings.

First Embodiment

(1) Configuration of Multifunction Peripheral 1

A multifunction peripheral 1 of the present embodiment shown in FIG. 1 is a multifunction peripheral having a plurality of functions including a printer function, a telephone function, and so on. The multifunction peripheral 1 has a wireless communication function of two kinds of wireless communication methods, that is, wireless LAN (Local Area Network) and NFC. The wireless LAN is a communication method that is specified by the IEEE802.11a/b/g/n standard, for example. Radio waves of 2.4 GHz or 5 GHz frequency band are used. The NFC is a near field wireless communication (non-contact communication) in which communication distance is limited to approximately 10 cm (centimeters). For example, radio waves of 13.56 MHz frequency band are used. The multifunction peripheral 1 is capable of performing NFC communication with an external communication device having a wireless communication function using NFC (hereinafter referred to as "NFC communication"). In the present embodiment, a smartphone 100 shown in FIG. 1 is described as an example of a communication device that is capable of performing NFC communication.

More specifically, as shown in FIG. 1, the multifunction peripheral 1 includes a control circuit 2, an NFC-IC 3, an EEPROM 4, a flash ROM 5, a wireless LAN communicator 6, a printer 7, a communication network connector 8, a power supply circuit 9, a RAM 10, and a serial-line cutoff switch (hereinafter, abbreviated as "cutoff switch") 20.

The power supply circuit 9 rectifies and transforms electric power inputted from the outside (for example, commercial electric power of AC 100V), and generates a first power supply voltage Vcc which is main power supply for operating the multifunction peripheral 1. The first power supply voltage Vcc generated by the power supply circuit 9 is supplied to each part in the multifunction peripheral 1, such as the control circuit 2, the NFC-IC 3, the EEPROM 4, the flash ROM 5, and the RAM 10.

The RAM 10 is used, when the control circuit 2 executes various control processes, for expanding programs to be executed and for temporarily storing various data, calculation results, and so on. The control circuit 2 controls various functions of the multifunction peripheral 1. The control circuit 2 includes a main controller 11 and a serial communication interface (I/F) 12. Further, the control circuit 2 has a serial port 13, a main power input port 14, an interrupt port 15, a switch control port 16, and a RAM port 17, as ports to which electric power and signals are inputted or from which electric power and signals are outputted.

The serial port 13 is connected to a serial line L which is a communication bus for serial communication. The first power supply voltage Vcc is inputted to the main power input port 14 from the power supply circuit 9. When the first power supply voltage Vcc is inputted to the control circuit 2 from the power supply circuit 9, the control circuit 2 operates by using the first power supply voltage Vcc as power supply (power source).

Interrupts are inputted to the interrupt port 15 from the NFC-IC 3. An interrupt inputted to the interrupt port 15 from the NFC-IC 3 is actually a state notification signal St of H (High) level or L (Low) level. A phrase that an interrupt is inputted means that the state notification signal St becomes H level.

A switch control signal Ss is outputted from the switch control port 16 to a cutoff switch 20 described later. The switch control signal Ss is a binary signal of H level or L level. The RAM port 17 is connected to the RAM 10. Access from the control circuit 2 to the RAM 10 is performed through the RAM port 17.

In the control circuit 2, the serial communication interface 12 is a communication interface for performing data communication by serial communication with the NFC-IC 3 and communication nodes of other communication targets. The serial communication interface 12 is connected to the serial port 13. Data of serial communication are transmitted and received through the serial communication interface 12 and the serial port 13.

The control circuit 2 is mutually connected to a plurality of data communication targets including the NFC-IC 3, the EEPROM 4, and the flash ROM 5, by the serial line L. Hence, the control circuit 2 performs serial communication mutually with the plurality of data communication targets including the NFC-IC 3, the EEPROM 4, and the flash ROM 5, through the serial line L.

Serial communication in the present embodiment is serial communication of a master-slave method. The control circuit 2 serves as the master in serial communication of the master-slave method. On the other hand, each of other communication nodes serves as the slave. Here, although the NFC-IC 3 normally serves as the slave, the NFC-IC 3 serves as the master in a certain case. That is, the NFC-IC 3 can serve as both the master and the slave in serial communication. Note that master-slave communication methods include various standards such as I2C (Inter-Integrated Circuit), USB (Universal Serial Bus), SDIO (Secure Digital Input/Output Card), and SPI (Serial Peripheral Interface), for example.

In the control circuit 2, the main controller 11 at least includes a microcomputer having a CPU, a memory, and so on. Upon starting up, the main controller 11 reads necessary setting information and programs from the flash ROM 5 and the EEPROM 4, develops the setting information and programs in the RAM 10, and appropriately performs a startup process needed for a normal operation. When the startup process is finished, the main controller 11 is ready to perform various functions. Here, the programs stored in the flash ROM 5 include firmware that is a program for controlling various hardware units in the multifunction peripheral 1, as will be described later.

After startup, upon starting the normal operation after finishing the startup process, the main controller 11 performs controls of serial communication through the serial communication interface 12, controls of the wireless LAN communicator 6, controls of the printer 7, controls of the communication network connector 8, and so on. Further, the main controller 11 performs various controls based on an interrupt inputted from the NFC-IC 3 (the state notification signal St), output controls of the switch control signal Ss, and so on.

The wireless LAN communicator 6 performs communication with an external communication device by wireless LAN. The printer 7 forms (prints) images on various recording mediums. The communication network connector 8 is connected to an external communication network, and performs communication such as telephone and facsimile.

The NFC-IC 3 is a wireless communication module for performing NFC communication with other communication devices capable of NFC communication. The NFC-IC 3 is mounted at an upper side within the multifunction peripheral 1. A loop antenna 3a for NFC communication is connected to the NFC-IC 3. By holding the smartphone 100 in a particular region near the upper side of the loop antenna 3a, NFC communication between the multifunction peripheral 1 and the smartphone 100 becomes possible, and wireless communication is performed in a particular communication procedure.

In the present specification, when it is described that the smartphone 100 is "held near" or "held over" the multifunction peripheral 1, unless otherwise noted, it means that the smartphone 100 and the multifunction peripheral 1 are put in such positional relationship that NFC communication can be performed mutually between the smartphone 100 and the multifunction peripheral 1.

The NFC-IC 3 includes a communication controller 21, an NFC interface 22, a serial communication interface 23, and a power feeding circuit 24. Further, the NFC-IC 3 has a serial port 25, a main power input port 26, a state notification port 27, and at least two power feeding ports 31 and 32, as ports to which electric power and signals are inputted or from which electric power and signals are outputted.

The serial line L is connected to the serial port 25. A power supply route from the power supply circuit 9 is connected to the main power input port 26, so that the first power supply voltage Vcc is inputted from the power supply circuit 9. When the first power supply voltage Vcc is inputted to the NFC-IC 3 from the power supply circuit 9, the NFC-IC 3 operates by using the first power supply voltage Vcc as power supply (power source). A second power supply voltage Vn (described later in detail) generated by the power feeding circuit 24 is outputted from the two power feeding ports 31 and 32. An interrupt (the state notification signal St) is outputted from the state notification port 27 to the control circuit 2.

When the smartphone 100 is held near the multifunction peripheral 1, there is a possibility that serial communication is performed. Hence, the communication controller 21 outputs an interrupt to the control circuit 2 (the state notification signal St is set to H level).

In the NFC-IC 3, the serial communication interface 23 is a communication interface for performing data communication with the control circuit 2 and other data communication targets by serial communication. The serial communication interface 23 is connected to the serial port 25. Data of serial communication are transmitted and received through the serial communication interface 23 and the serial port 25. The NFC interface 22 is a wireless communication interface for performing NFC communication with the smartphone 100. The loop antenna 3*a* is connected to the NFC interface 22.

When the smartphone 100 is held near the multifunction peripheral 1, electromotive force is induced in the loop antenna 3*a* (that is, electric power is received from the smartphone 100). The power feeding circuit 24 generates a DC (direct current) second power supply voltage Vn based on the induced electromotive force. In the present embodiment, the value of the second power supply voltage Vn is the same as the value of the first power supply voltage Vcc generated by the power supply circuit 9. However, the value of the second power supply voltage Vn can be set appropriately, as long as the communication nodes of serial communication such as the EEPROM 4 and the flash ROM 5 (the supply target of the second power supply voltage Vn) are operable.

When electric power is received from the smartphone 100 by the loop antenna 3*a*, the power feeding circuit 24 generates the second power supply voltage Vn and supplies the generated second power supply voltage Vn to each part in the NFC-IC 3 such as the communication controller 21 and the interfaces 22, 23. Hence, even if the NFC-IC 3 is not supplied with the first power supply voltage Vcc by the power supply circuit 9, the communication controller 21 starts operation when the smartphone 100 is held near the multifunction peripheral 1 and the second power supply voltage Vn is generated.

The second power supply voltage Vn generated by the power feeding circuit 24 is outputted from each power feeding port 31, 32 to the outside (the outside of the NFC-IC 3 within the multifunction peripheral 1). In the present embodiment, the communication controller 21 controls the power feeding circuit 24 to output the second power supply voltage Vn to each power feeding port 31, 32, individually (selectively). That is, the communication controller 21 can output the second power supply voltage Vn generated by the power feeding circuit 24 only to the first power feeding port 31, so that the second power supply voltage Vn is outputted to the outside from the first power feeding port 31. Also, the communication controller 21 can output the second power supply voltage Vn only to the second power feeding port 32, so that the second power supply voltage Vn is outputted to the outside from the second power feeding port 32. Also, the communication controller 21 can output the second power supply voltage Vn to the both power feeding ports 31 and 32, so that the second power supply voltage Vn is outputted to the outside from the both power feeding ports 31 and 32.

The first power feeding port 31 is connected to a power input port 42 of the EEPROM 4 via a first diode D21. When the second power supply voltage Vn is outputted from the first power feeding port 31, the second power supply voltage Vn is supplied to the EEPROM 4.

The second power feeding port 32 is connected to a power input port 52 of the flash ROM 5 via a second diode D22. When the second power supply voltage Vn is outputted from the second power feeding port 32, the second power supply voltage Vn is supplied to the flash ROM 5.

The communication controller 21 at least includes a microcomputer having a CPU 21*a*, a memory 21*b*, and so on. The communication controller 21 performs, based on various programs and data stored in the memory 21*b*, controls of serial communication through the serial communication interface 23, controls of NFC communication through the NFC interface 22, and controls of the power feeding circuit 24 (for example, controls of outputting the second power supply voltage Vn to the outside). The communication controller 21 also performs controls of the state notification signal St based on whether the smartphone 100 is held near the multifunction peripheral 1.

The communication controller 21 normally operates itself as the slave in controlling serial communication. In a particular state, however, the communication controller 21 sets itself as the master and operates as the master. Specifically, the communication controller 21 determines whether the first power supply voltage Vcc is supplied to the NFC-IC 3 and, if the first power supply voltage Vcc is supplied, set the communication controller 21 itself as the slave. If the first power supply voltage Vcc is not supplied to the NFC-IC 3, that is, if the communication controller 21 is operating by using the second power supply voltage Vn, the communication controller 21 sets itself as the master. If supplying of the first power supply voltage Vcc is started while the communication controller 21 is actually performing serial communication as the master, the communication controller 21 continues operating as the master at least until the end of the serial communication that is being performed.

The EEPROM 4 is a nonvolatile memory in which stored contents (data) are rewritable electrically. In the present embodiment, the EEPROM 4 stores various kinds of information, such as information that is needed for the main controller 11 of the control circuit 2 to control execution of various functions, and information that is generated as a result of the main controller 11 controlling execution of various functions.

Reading of various information from the EEPROM 4 and writing of various information to the EEPROM 4 are performed mainly by the main controller 11 of the control circuit 2 in a normal time in which the power is ON (that is, the first power supply voltage Vcc is supplied). Further, in the present embodiment, in a power off time in which the power is OFF and the NFC-IC 3 is started up by the second power supply voltage Vn, the communication controller 21 of the NFC-IC 3 can perform reading of information from the EEPROM 4 and writing of information to the EEPROM 4.

Information stored in the EEPROM 4 includes, for example, setting environmental data and firmware information shown in FIG. 1. In addition, the EEPROM 4 stores various kinds of information such as model information of the multifunction peripheral 1, telephone directory information, and error information at the time of a failure. The firmware information includes various kinds of information relating to firmware, such as a name and a version of firmware stored in the flash ROM 5.

The setting environmental data is data that is appropriately written or updated by the main controller 11 of the control circuit 2 during a normal operation, depending on operations of the user or a usage status of the user. Specific examples of the setting environmental data include, for example, the number of printing times for each kind of printing paper, the number of printing times for each color mode (for example, monochromatic printing, color printing, and so on), setting information of wireless LAN (for example, identification information of an access point, SSID, and so on), and setting information of favorite buttons. The user of the multifunction peripheral 1 can register particular functions (for example, functions of high frequency of usage), as favorite functions, out of various functions of the multifunction peripheral 1. The multifunction peripheral 1 is provided with a favorite button. Upon the user's operation on the favorite button, functions registered as the favorite functions are displayed in a view format. The user can select a desired function from the favorite functions displayed in the view format, thereby performing the function. Favorite-button setting information is information indicative of functions that are registered as the favorite functions. As described above, the setting environmental data is information that reflects the usage status of the user of the multifunction peripheral 1.

The EEPROM 4 can operate as a communication node of serial communication. That is, the EEPROM 4 includes a serial port 41. The serial line L is connected to the serial port 41. Hence, the EEPROM 4 can perform serial communication with the control circuit 2, the NFC-IC 3, and so on via the serial port 41. The EEPROM 4 operates as the slave in serial communication. Various kinds of information are written in or read out from the EEPROM 4 by serial communication (that is, through the serial line L).

The EEPROM 4 has a power input port 42. The power input port 42 is connected to the power supply circuit 9 via a diode D11, and is connected to the first power feeding port 31 of the NFC-IC 3 via the first diode D21. That is, the power input port 42 of the EEPROM 4 can be supplied with the first power supply voltage Vcc from the power supply circuit 9 via the diode D11, and can also be supplied with the second power supply voltage Vn from the NFC-IC 3 via the first diode D21. Hence, the EEPROM 4 starts operation upon receiving supply of at least one of the first power supply voltage Vcc and the second power supply voltage Vn, so that the above-described serial communication can be performed.

The flash ROM 5 is a nonvolatile memory (flash memory) in which stored data is rewritable electrically. The flash ROM 5 stores firmware, other various programs, data, and so on.

The flash ROM 5 can operate as a communication node of serial communication. That is, the flash ROM 5 has a serial port 51. The serial line L is connected to the serial port 51. Hence, the flash ROM 5 can perform serial communication with the control circuit 2, the NFC-IC 3, and so on, via the serial port 51. The flash ROM 5 operates as the slave in serial communication. Various kinds of information are written in or read out from the flash ROM 5 by serial communication (that is, through the serial line L).

The flash ROM 5 has a power input port 52. The power input port 52 is connected to the power supply circuit 9 via the diode D12, and is connected to the second power feeding port 32 of the NFC-IC 3 via the second diode D22. That is, the power input port 52 of the flash ROM 5 can be supplied with the first power supply voltage Vcc from the power supply circuit 9 via the diode D12, and can also be supplied with the second power supply voltage Vn from the NFC-IC 3 via the second diode D22. Hence, the flash ROM 5 starts operation upon receiving supply of at least one of the first power supply voltage Vcc and the second power supply voltage Vn, so that the above-described serial communication can be performed.

The diode D11 and the diode D12 are provided for cutting off the second power supply voltage Vn outputted from each power feeding port 31, 32 of the NFC-IC 3 from being supplied, through the supply route of the first power supply voltage Vcc, to other supply targets of the first power supply voltage Vcc that are other than the communication nodes such as the EEPROM 4 and the flash ROM 5, which are original supply targets.

The first diode D21 is provided for cutting off the first power supply voltage Vcc outputted from the power supply circuit 9 from being inputted (counterflowing) to the first power feeding port 31 of the NFC-IC 3 via the supply route of the second power supply voltage Vn. The second diode D22 is provided for cutting off the first power supply voltage Vcc outputted from the power supply circuit 9 from being inputted (counterflowing) to the second power feeding port 32 of the NFC-IC 3 via the supply route of the second power supply voltage Vn.

The serial line L is provided with the cutoff switch 20 for cutting off connection between the control circuit 2 and other communication nodes. Hence, while the cutoff switch 20 is ON, the control circuit 2 is connected to the other communication nodes so that serial communication can be performed mutually. However, while the cutoff switch 20 is OFF, connection between the control circuit 2 and the other communication nodes is cut off so that the control circuit 2 cannot perform serial communication with the communication nodes.

The ON and OFF of the cutoff switch 20 is controlled by the switch control signal Ss outputted from the control circuit 2. While the switch control signal Ss is at L level, the cutoff switch 20 is in an OFF state and the serial line L is cut off. While the switch control signal Ss is at H level, the cutoff switch 20 is in an ON state so that the control circuit 2 can perform serial communication with the other communication nodes.

In the present embodiment, the cutoff switch 20 is a switch of a so-called normally open type. Hence, while the control circuit 2 is not supplied with the first power supply voltage Vcc and stops its operation (that is, while the switch control signal Ss is at L level), the cutoff switch 20 is in an OFF state so that a cutoff state of the serial line L is maintained.

If an interrupt is outputted from the NFC-IC 3 at the time of startup, the main controller 11 of the control circuit 2 maintains the OFF state of the cutoff switch 20. Then, when the interrupt is canceled after startup, the cutoff switch 20 is turned ON. If no interrupt is outputted from the NFC-IC 3 at the time of startup, the main controller 11 of the control circuit 2 turns on the cutoff switch 20. After the cutoff switch 20 is turned on, the ON state of the cutoff switch 20 is continued even if an interrupt is outputted again.

Note that each of the control circuit 2, the NFC-IC 3, the EEPROM 4, and the flash ROM 5 is made of a packaged semiconductor integrated circuit (IC).

(2) Schematic Configuration of Smartphone 100

The smartphone 100 is a multifunction mobile communication device having functions of common mobile phones, such as telephone and mail functions, as well as Internet connection function. In addition, various functions can be added to the smartphone 100 by installing various kinds of application software (hereinafter abbreviated as "application").

The smartphone 100 is capable of wireless LAN communication and NFC communication. Hence, the smartphone 100 performs mutual communication with the multifunction peripheral 1 by NFC communication. Further, the smartphone 100 is capable of wireless LAN communication with other communication devices.

Applications of the smartphone 100 include a firmware update application for updating firmware of the multifunction peripheral 1. Upon starting up the firmware update application on the smartphone 100, the smartphone 100 displays an inquiry screen for inquiring whether to download a latest version of firmware program of the multifunction peripheral 1 (hereinafter referred to as "firmware data") from a server. When the user performs an operation for downloading the firmware data, the firmware data is downloaded from the server to the smartphone 100. Here, firmware header information relating to the content of the firmware data is attached to the firmware data. The firmware header information is information indicative of what has changed compared with an older version (normally, the version just before the latest version).

Firmware data downloaded from the server is normally firmware data of the latest version at the time of the downloading. However, it is possible to specify and download firmware data of a particular version that is older than the latest version and to update the firmware data to the particular version.

When the smartphone 100 into which firmware data is downloaded is held near the multifunction peripheral 1. NFC communication with the multifunction peripheral 1 is started. Then, if it is determined that update is necessary in the multifunction peripheral 1, the smartphone 100 transmits the firmware data to the multifunction peripheral 1. In this way, firmware update (update to the firmware data downloaded from the server) is performed in the multifunction peripheral 1.

In the present embodiment, even in a power off state of the multifunction peripheral 1 (a state in which the first power supply voltage Vcc is not supplied), when the smartphone 100 is held near the multifunction peripheral 1, the second power supply voltage Vn is generated in the NFC-IC 3 of the multifunction peripheral 1 by non-contact power feeding from the smartphone 100. Hence, firmware can be updated through the smartphone 100 in a state where the main power of the multifunction peripheral 1 remains an OFF state.

(3) Operational Example of Multifunction Peripheral 1

An operational example of the multifunction peripheral 1 will be described while referring to FIGS. 2A-2D. In FIGS. 2A-2D, for simplification, elements needed for description of the operational example, out of the elements of the multifunction peripheral 1, are illustrated in a simplified manner.

When the power plug of the multifunction peripheral 1 is pulled out and the smartphone 100 is not held near the multifunction peripheral 1 (see FIG. 2A), neither the first power supply voltage Vcc nor the second power supply voltage Vn is generated, and both the control circuit 2 and the NFC-IC 3 are in a stopped state. FIG. 2A shows that state in a schematic manner. When the power plug is inserted but the main power is turned off by a switch, too, the first power supply voltage Vcc is not generated.

The multifunction peripheral 1 of the present embodiment has an OFF mode as an operational mode. Specifically, after startup, when a particular OFF mode condition is satisfied, supplying of the first power supply voltage Vcc from the power supply circuit 9 is completely stopped, which shifts the operational mode to the OFF mode. In the OFF mode, however, operations of requisite minimum functions such as ON-OFF detection of the power switch and OFF-mode cancel condition detection are continued by a backup power supply (not shown) such as a secondary battery and a supercapacitor. Hence, if the power switch is turned on in the OFF mode or if an OFF-mode cancel condition is satisfied (for example, an incoming telephone call or facsimile is received, and so on), the OFF mode is canceled, the power supply circuit 9 starts up, and the operational mode shifts to a normal operation.

In a state where the operation of the multifunction peripheral 1 is stopped without supply of the power supply voltages Vcc, Vn, no interrupt is outputted (that is, the state notification signal St is L level), the switch control signal Ss is L level, and the cutoff switch 20 is off.

If, for example, the smartphone 100 is held near the multifunction peripheral 1 in a state where the operation of the multifunction peripheral 1 is stopped as described above, as shown in FIG. 2B, the second power supply voltage Vn is generated in the NFC-IC 3, which causes the NFC-IC 3 to start up. Upon startup of the NFC-IC 3, the second power supply voltage Vn is supplied from the NFC-IC 3 to the communication nodes such as the EEPROM 4 and the flash ROM 5, which enables serial communication between the NFC-IC 3 and the communication nodes, and hence enables communication between the smartphone 100 and the communication nodes via the NFC-IC 3. In serial communication in this case, the NFC-IC 3 operates as the master. Here, upon detecting that the smartphone 100 is held near the multifunction peripheral 1 at startup, the NFC-IC 3 outputs an interrupt to the control circuit 2 (the state notification signal St is set to H level).

When the power switch is turned on or the OFF-mode cancel condition is satisfied and hence the power supply circuit 9 starts up in a state shown in FIG. 2B, as shown in FIG. 2C, the first power supply voltage Vcc is outputted from the power supply circuit 9. This causes the control circuit 2 to start up. If the control circuit 2 detects, at startup, that an interrupt is outputted, the control circuit 2 maintains the switch control signal Ss at L level to maintain the cutoff switch 20 in an OFF state.

After that, if the smartphone 100 is separated from the multifunction peripheral 1 and NFC communication or serial communication using the NFC-IC 3 as the master is stopped, as shown in FIG. 2D, the NFC-IC 3 cancels the interrupt (the state notification signal St is set to L level). Due to this cancellation of interrupt, the control circuit 2 sets the switch control signal Ss to H level so that the cutoff switch 20 is turned on.

When the interrupt is canceled, the NFC-IC 3 starts operating as the slave in serial communication. This enables the control circuit 2, the NFC-IC 3, and the EEPROM 4 to perform serial communication with one another. Even if the smartphone 100 is separated from the multifunction peripheral 1 after startup of the power supply circuit 9 and the second power supply voltage Vn is not generated anymore, each section in the multifunction peripheral 1 can continue normal operation by using the first power supply voltage Vcc.

(3-1) Operation at Power ON

When the main power is turned on in the multifunction peripheral 1 and the control circuit 2 starts up, the main controller 11 starts a normal operation after performing the above-described startup process. If the smartphone 100 is held near the multifunction peripheral 1 during the normal operation, first, the communication controller 21 of the NFC-IC 3 performs NFC communication with the smartphone 100 and, depending on that communication, serial communication between the control circuit 2 and the NFC-IC 3 is performed. For example, if setting information of wireless LAN is notified from the smartphone 100, the setting information is transmitted from the NFC-IC 3 to the control circuit 2 by serial communication. Upon receiving the setting information from the NFC-IC 3, the main controller 11 of the control circuit 2 performs a particular process (for example, writing the setting information to the EEPROM 4).

When the firmware update application is started and the smartphone 100 into which firmware data is downloaded is held near the multifunction peripheral 1, the communication controller 21 of the NFC-IC 3 receives the firmware data from the smartphone 100, and transmits the firmware data to the control circuit 2 by serial communication. Upon receiving the firmware data from the NFC-IC 3, the main controller 11 of the control circuit 2 performs an updating process of updating firmware stored in the flash ROM 5 based on the content of the received firmware data (including the content of the firmware header information).

(3-2) Firmware Update Procedure at Power OFF

A procedure of updating firmware of the multifunction peripheral 1 by using the smartphone 100 at power OFF will be described while referring to FIG. 3. Here, as a precondition, firmware update application is started in the smartphone 100, and firmware data is already downloaded from the server.

In FIG. 3, all of the communication between the NFC-IC 3 and the smartphone 100 is performed by NFC communication. Further, all of the communication between the NFC-IC 3 and the EEPROM 4 and communication between the NFC-IC 3 and the flash ROM 5 is performed by serial communication in which the NFC-IC 3 serves as the master.

As shown in FIG. 3, if the smartphone 100 is held near the multifunction peripheral 1 when the power of the multifunction peripheral 1 is OFF, the multifunction peripheral 1 generates the second power supply voltage Vn based on electric power that is received from the smartphone 100 in a non-contact manner, so that the NFC-IC 3 starts up. Upon starting up, the NFC-IC 3 transmits a data request to the smartphone 100.

In response to this data request, the smartphone 100 transmits downloaded firmware data to the multifunction peripheral 1. Upon receiving the firmware data from the smartphone 100, the NFC-IC 3 temporarily stores the received firmware data in the memory 21b.

When the NFC-IC 3 recognizes that the firmware update application is started up in the smartphone 100 based on reception of the firmware data, the NFC-IC 3 supplies the second power supply voltage Vn to the EEPROM 4 from the first power feeding port 31. At this time, the second power supply voltage Vn is not supplied from the power feeding port other than the first power feeding port 31. Upon receiving supplying of the second power supply voltage Vn, the EEPROM 4 starts up. Note that, in FIG. 3, "IC" for the EEPROM 4 refers to the EEPROM 4, and "IC" for the flash ROM 5 refers to the flash ROM 5.

After supplying the second power supply voltage Vn to the EEPROM 4, the NFC-IC 3 transmits a setting-environmental-data request command to the EEPROM 4. If the EEPROM 4 receives the setting-environmental-data request command from the NFC-IC 3 after startup, the EEPROM 4 transmits setting environmental data to the NFC-IC 3. Upon receiving the setting environmental data from the EEPROM 4, the NFC-IC 3 stops supplying of the second power supply voltage Vn to the EEPROM 4. Thus, the EEPROM 4 stops its operation.

After stopping supplying of the second power supply voltage Vn to the EEPROM 4, the NFC-IC 3 compares the firmware data temporarily stored in the memory 21b with the setting environmental data received from the EEPROM 4, and determines whether firmware stored in the flash ROM 5 needs to be updated. Specifically, this determination is performed based on whether there is relationship between information included in the setting environmental data and the firmware header information added to the firmware data, whether a degree of the relationship is high, and so on.

For example, if the firmware header information indicates that a program relating to wireless LAN is updated and if the setting environmental data includes setting information of wireless LAN, the NFC-IC 3 determines that there is relationship between the firmware header information and the setting environmental data and that update is needed. Conversely, if the setting environmental data does not include setting information of wireless LAN, it is presumed that the user of the multifunction peripheral 1 does not use the wireless LAN function of the multifunction peripheral 1. In this case, because it is not necessary to perform firmware update relating to wireless LAN, the NFC-IC 3 determines that there is no relationship between the firmware header information and the setting environmental data and that update is not needed.

Further, for example, if the firmware header information indicates that a program relating to a function registered as the favorite function is updated, the NFC-IC 3 determines that there is relationship between the firmware header information and the setting environmental data and that update is needed. Further, for example, the firmware header information indicates that a program relating to the color printing function is updated and if the number of times of color printing indicated by the setting environmental data is very few, the NFC-IC 3 determines that there is relationship but a degree of the relationship is very low and that update is not needed.

In this way, if the update indicated by the firmware header information includes a content having relationship (or having a high degree of relationship) with the setting environmental data, it is determined that update of the firmware is needed. Conversely, if the update does not include a content having relationship with the setting environmental data (or if the update only includes a content having a low degree of relationship with the setting environmental data), it is determined that update of the firmware is not needed. Here, in a case that the existence or degree of relationship can be determined based on comparison between the firmware data itself and the setting environmental data, a comparison may be made between the firmware data itself and the setting environmental data, instead of the firmware header information (or together with the firmware header information), in order to determine whether update is needed.

If it is determined that update of the firmware is needed, the NFC-IC 3 supplies the second power supply voltage Vn from the second power feeding port 32 to the flash ROM 5. At this time, the second power supply voltage Vn is not supplied from the power feeding port other than the second power feeding port 32. When the second power supply voltage Vn is supplied, the flash ROM 5 starts up.

After supplying the second power supply voltage Vn to the flash ROM 5, the NFC-IC 3 transmits firmware data to the flash ROM 5. When the flash ROM 5 receives firmware data from the NFC-IC 3 after startup, the flash ROM 5 updates firmware by writing the firmware data.

Note that firmware update in the flash ROM 5 may be performed by overwriting the existing firmware (replacing the existing firmware), or may be performed by writing new firmware data while keeping the existing firmware.

As to firmware update in the flash ROM 5, for example, the NFC-IC 3 may merely transmit firmware data, and the flash ROM 5 may actively perform an updating process. Further, for example, the NFC-IC 3 may actively transmit firmware data, give an update command, and so on, and the flash ROM 5 may passively perform firmware update in accordance with data, a command, and so on, received from the NFC-IC 3.

When firmware update is finished in the flash ROM 5, the NFC-IC 3 stops supplying of the second power supply voltage Vn to the flash ROM 5. Then, the flash ROM 5 stops operating.

On the other hand, if it is determined that update is not needed in determination whether firmware update is needed, the NFC-IC 3 transmits, to the smartphone 100, an update unnecessary notification indicating that update is unnecessary. When the smartphone 100 receives the update unnecessary notification from the multifunction peripheral 1, the smartphone 100 displays, on the display, a screen indicating that firmware update is not needed and an update necessity inquiring screen for again asking the user whether update is needed.

In response to this, if the user's instruction of update is given to the smartphone 100, the smartphone 100 transmits an update request to the multifunction peripheral 1. When the update request is received from the smartphone 100, the NFC-IC 3 supplies the second power supply voltage Vn to the flash ROM 5, and performs firmware update as described above.

After firmware update is finished, or if the update request is not transmitted from the smartphone 100 although the update unnecessary notification is transmitted, the NFC-IC 3 transmits, to the smartphone 100, a deletion permission request for inquiring whether firmware data stored temporarily in the memory 21b may be deleted.

Upon receiving the deletion permission request from the multifunction peripheral 1, the smartphone 100 displays, on the display, a deletion permission inquiring screen for inquiring whether firmware stored in the memory 21b may be deleted. In response to this, if the user's instruction of permitting deletion is given to the smartphone 100, the smartphone 100 transmits a deletion command to the multifunction peripheral 1. Upon receiving the deletion command from the smartphone 100, the NFC-IC 3 deletes firmware data stored temporarily in the memory 21b and transmits a deletion completion notification to the smartphone 100.

If the deletion completion notification is received from the multifunction peripheral 1, or if the user gives an instruction of no deletion in response to the deletion permission inquiring screen, the smartphone 100 displays a screen indicating that the process is finished.

(4) Various Control Processes Executed by Multifunction Peripheral 1

Figure 4:
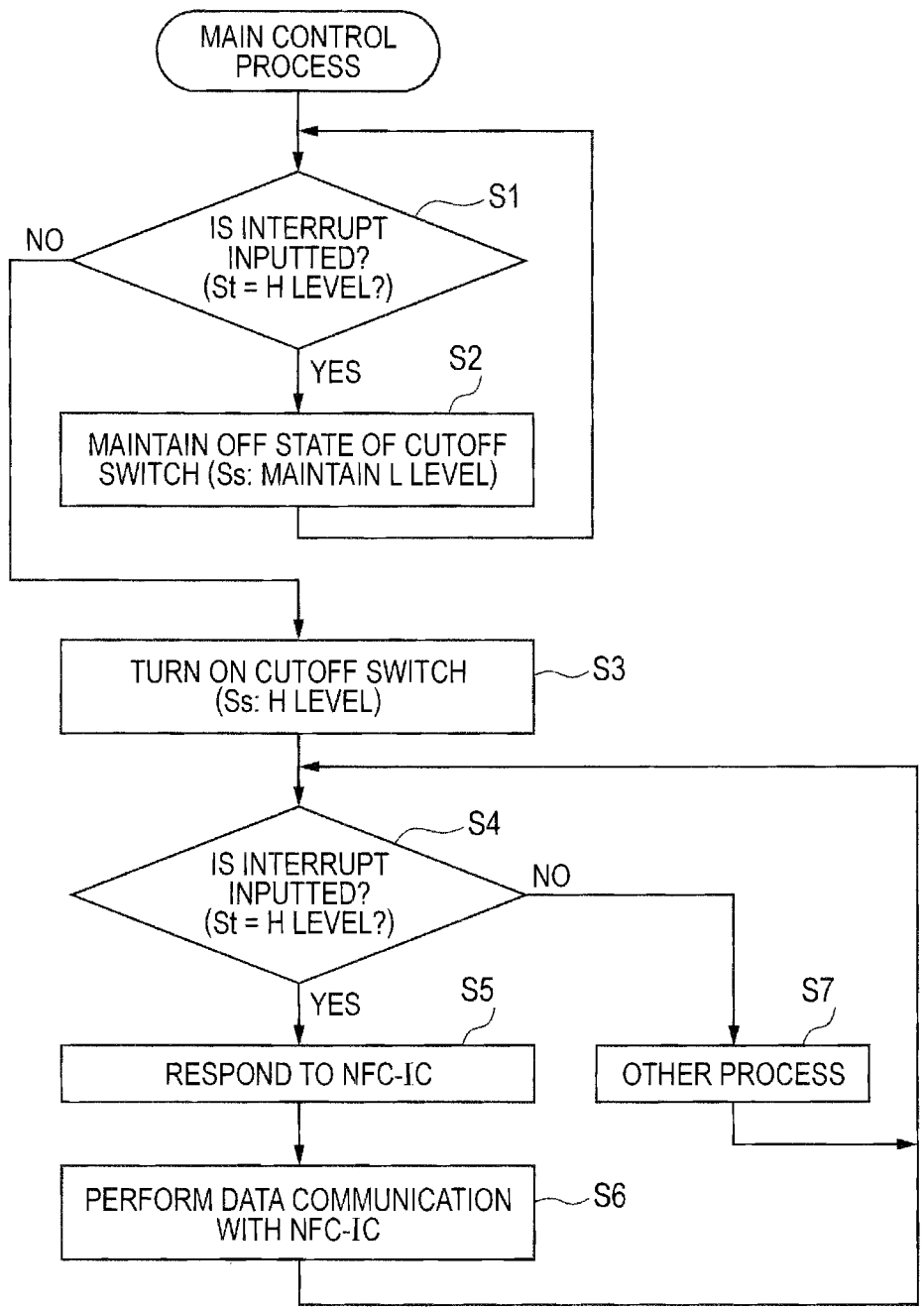
FIG. 4 is a flowchart showing a main control process according to the first embodiment.
Figure 5:
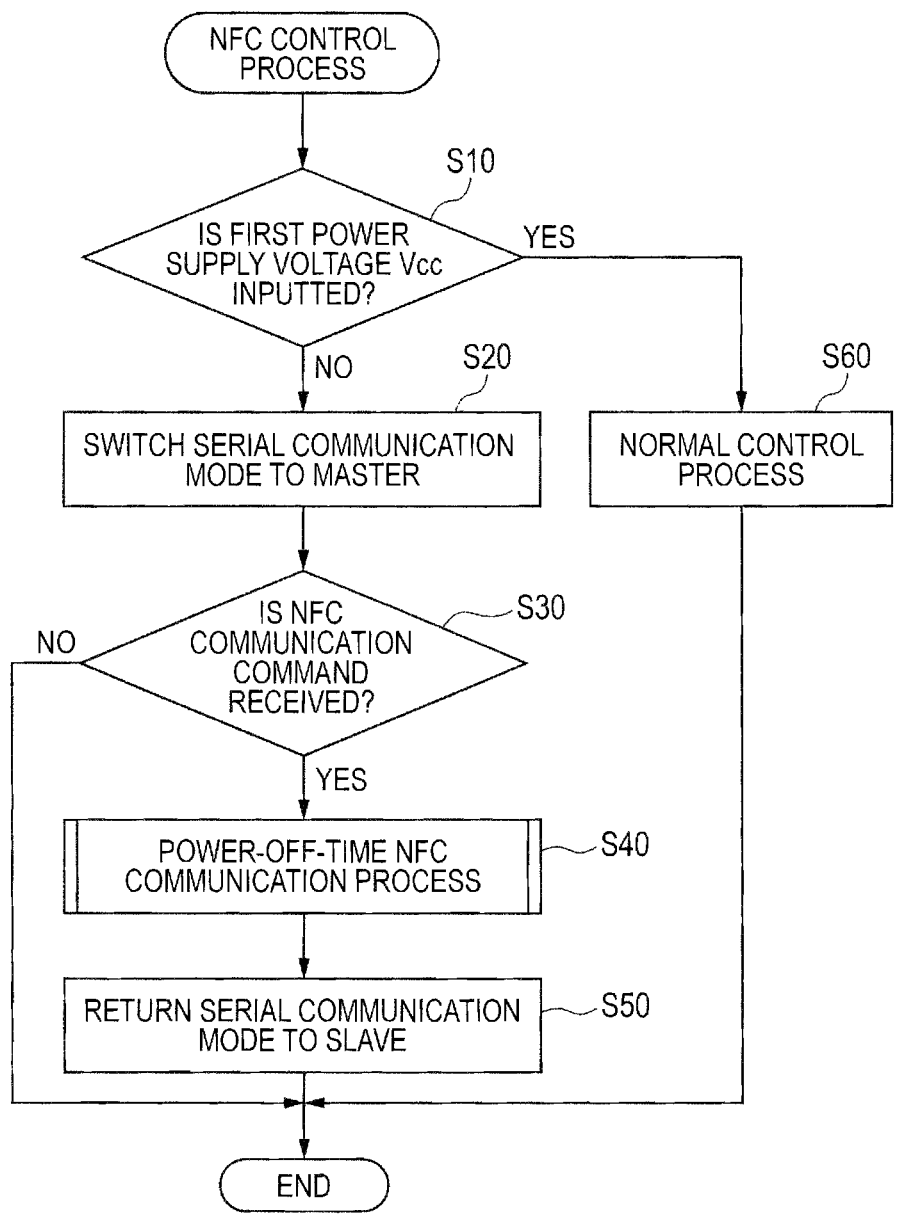
FIG. 5 is a flowchart showing an NFC control process according to the first embodiment.

Descriptions will be provided for a main control process executed by the main controller 11 of the control circuit 2 in the multifunction peripheral 1 and for an NFC control process executed by the communication controller 21 of the NFC-IC 3 while referring to FIGS. 4 and 5.

(4-1) Main Control Process

The main control process executed by the main controller 11 of the control circuit 2 will be described while referring to FIG. 4. In the main controller 11, upon starting up by the first power supply voltage Vcc, the CPU reads out a program of the main control process in FIG. 4 from the memory and executes the program.

Upon starting the main control process in FIG. 4, in S1 the CPU of the main controller 11 determines whether an interrupt is inputted from the NFC-IC 3, that is, whether the state notification signal St is H level.

If an interrupt is inputted in S1 (S1: YES), in S2 the CPU maintains an L level state of the switch control signal Ss so that the OFF state of the cutoff switch 20 is maintained. After S2, the process returns to S1. That is, if an interrupt is inputted when the main controller 11 starts up, the OFF state of the cutoff switch 20 is maintained until the interrupt is cancelled. If no interrupt is inputted (S1: NO), in S3 the CPU sets the switch control signal Ss to H level so that the cutoff switch 20 is turned ON, and advances to S4.

In S4, the CPU determines whether an interrupt is inputted from the NFC-IC 3. If no interrupt is inputted (S4: NO), in S7 the CPU executes other processes (processes relating other various functions; details are omitted) and returns to S4. If an interrupt is inputted in S4 (S4: YES), in S5 the CPU transmits, to the NFC-IC 3, a response to the interrupt by serial communication. In S6, the CPU performs data communication (serial communication) with the NFC-IC 3 and returns to S4.

(4-2) NFC Control Process Executed by NFC-IC 3

An NFC control process executed by the communication controller 21 of the NFC-IC 3 will be described while referring to FIG. 5. When the communication controller 21 of the NFC-IC 3 starts up by receiving supplying of the first power supply voltage Vcc or the second power supply voltage Vn, the CPU 21a sets a serial communication mode of the NFC-IC 3 itself to slave, as one of initial settings. After the initial settings, the CPU 21a reads a program of the NFC control process of FIG. 5 from the memory 21b, and repeatedly executes the program.

Upon starting the NFC control process of FIG. 5, in S10 the CPU 21a of the communication controller 21 determines whether the first power supply voltage Vcc is inputted to the main power input port 26 (that is, whether the main body of the multifunction peripheral 1 is in a power-on state). If the first power supply voltage Vcc is inputted (S10: YES), in S60 the CPU 21a executes a normal control process in a power-on time.

If the first power supply voltage Vcc is not inputted (S10: NO), in S20 the CPU 21a switches the serial communication mode of the NFC-IC 3 to master. Note that determination in S10 that the first power supply voltage Vcc is not inputted means that an external communication device capable of NFC communication (for example, the smartphone 100; hereinafter also referred to as "external device") is held near the multifunction peripheral 1, which causes the second power supply voltage Vn to be generated, and the NFC-IC 3 is started up by using the second power supply voltage Vn.

In S30, the CPU 21a determines whether an NFC communication command is received from the smartphone 100 by NFC communication. If the NFC communication command is not received (S30: NO), the CPU 21a finishes the NFC control process. If the NFC communication command is received (S30: YES), in S40 the CPU 21a executes a power-off-time NFC communication process. When the power-off-time NFC communication process in S40 is finished, in S50 the CPU 21a returns the serial communication mode of the NFC-IC 3 to slave, and finishes the NFC control process.

Figure 6:
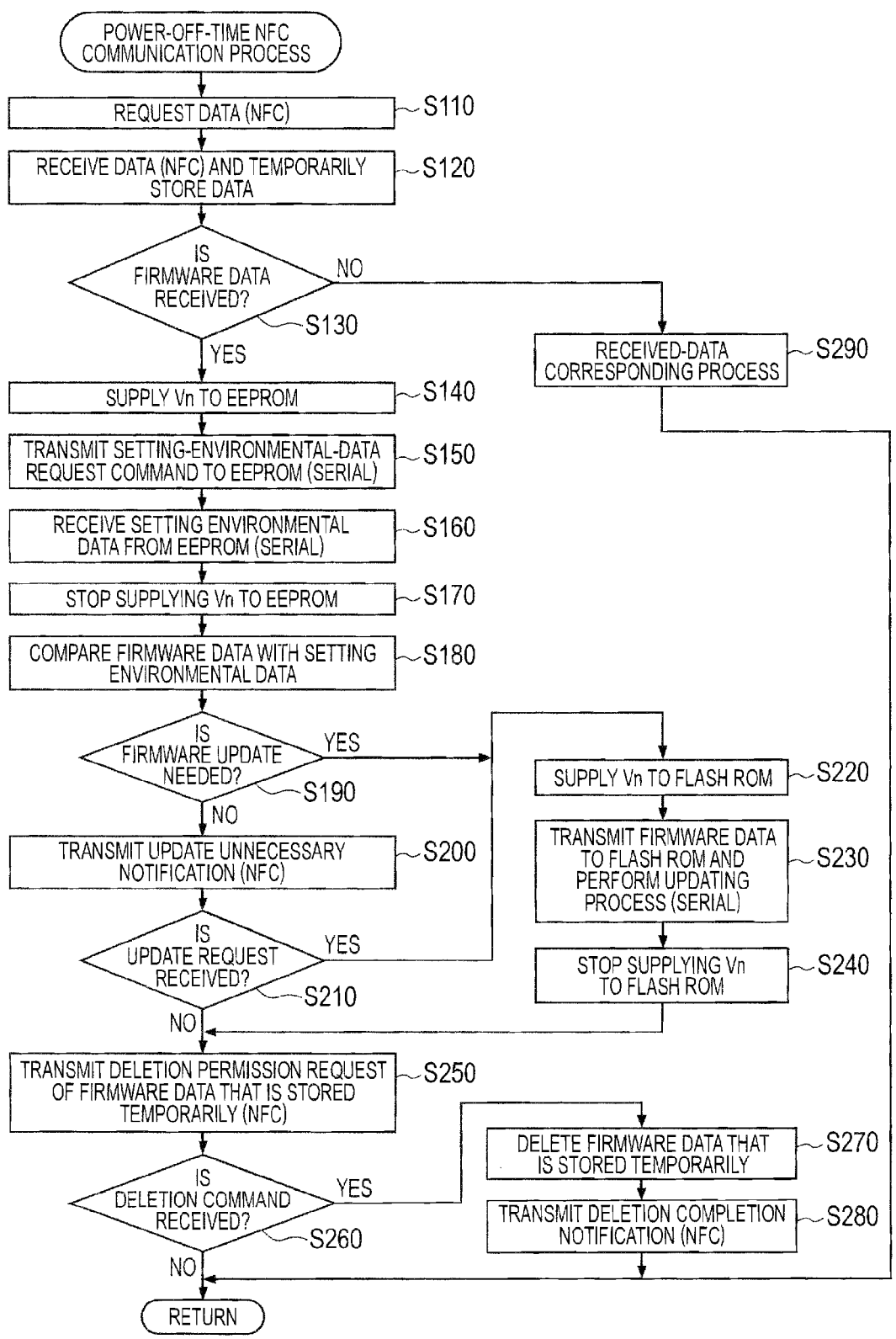
FIG. 6 is a flowchart showing details of a power-off-time NFC communication process of S40 in the NFC control process shown in FIG. 5.

Details of the power-off-time NFC communication process of S40 are shown in FIG. 6. Upon shifting to the power-off-time NFC communication process shown in FIG. 6, in S110 the CPU 21a of the communication controller 21 transmits a data request to the smartphone 100 by NFC communication. In S120, the CPU 21a receives data transmitted from the smartphone 100 by NFC communication in response to the data request of S110, and temporarily stores the data in the memory 21b.

In S130, the CPU 21a determines whether the data received from the smartphone 100 is firmware data. If the received data is not firmware data (S130: NO), in S290 the CPU 21a executes a received-data corresponding process corresponding to the received data, and finishes the power-off-time NFC communication process.

If the received data in S130 is firmware data (S130: YES), a firmware update application is started up in the smartphone 100. Hence, in S140 the CPU 21a supplies the second power supply voltage Vn from the first power feeding port 31 to the EEPROM 4. In S150, the CPU 21a transmits a setting-environmental-data request command to the EEPROM 4 by serial communication. In S160, the CPU 21a receives setting environmental data transmitted from the EEPROM 4 by serial communication in response to the setting-environmental-data request command of S150. After receiving the setting environmental data, in S170 the CPU 21a stops supplying of the second power supply voltage Vn to the EEPROM 4.

In S180, the CPU 21a compares firmware data temporarily stored in the memory 21b with the setting environmental data received from the EEPROM 4, and determines whether update of the firmware stored in the flash ROM 5 is needed. In S190, based on comparison and determination results in S180, the CPU 21a determines whether update of the firmware is needed. Specific method of determination is already described above.

If it is determined that update of the firmware is not needed (S190: NO), in S200 the CPU 21a transmits an update unnecessary notification to the smartphone 100 by NFC communication. In S210, the CPU 21a determines whether an update request is received from the smartphone 100 in response to the update unnecessary notification transmitted in S200. If the update request is not received (S210: NO), the process advances to S250.

If it is determined in S190 that update of the firmware is needed (S190: YES), in S220 the CPU 21a supplies the second power supply voltage Vn from the second power feeding port 32 to the flash ROM 5. In S230, the CPU 21a transmits firmware data to the flash ROM 5 by serial communication, and updates firmware in the flash ROM 5. Upon finishing update of the firmware, in S240 the CPU 21a stops supplying of the second power supply voltage Vn to the flash ROM 5, and advances to S250.

In S250, the CPU 21a transmits, to the smartphone 100, a deletion permission request of firmware data stored temporarily in the memory 21b, by NFC communication. In S260, the CPU 21a determines whether a deletion command is received from the smartphone 100 in response to the deletion permission request of S250. If the deletion command is not received (S260: NO), the power-off-time NFC communication process ends.

If the deletion command is received in S260 (S260: YES), in S270 the CPU 21a deletes firmware data stored temporarily in the memory 21b. In S280, the CPU 21a transmits a deletion completion notification to the smartphone 100 by NFC communication.

(5) Effects of the Embodiment

According to the multifunction peripheral 1 of the above-described embodiment, even at power-off time of the main body of the multifunction peripheral 1, when the smartphone 100 is held near the multifunction peripheral 1, NFC communication with the smartphone 100 can be performed by electric power received from the smartphone 100 (that is, by using the second power supply voltage Vn), and the communication node such as the EEPROM 4 and the flash ROM 5 can be operated by using the electric power received from the smartphone 100. Hence, even at power-off time, the communication node such as the EEPROM 4 can be accessed from the smartphone 100.

Also, the second power supply voltage Vn generated in the NFC-IC 3 is not supplied to all the supply targets of the first power supply voltage Vcc, and is not supplied at least to the control circuit 2. Further, the second power supply voltage Vn can be supplied selectively to either one of the EEPROM 4 and the flash ROM 5.

Hence, even at power-off time of the main body, the second power supply voltage Vn is supplied appropriately to necessary sections, so that NFC communication and accompanying serial communication with a plurality of communication nodes can be performed appropriately and successfully, while suppressing the amount of power feeding from the smartphone 100 (in other words, the consumption amount of received electric power).

Especially, in the present embodiment, in a case where firmware data is received from the smartphone 100, the second power supply voltage Vn is supplied to the EEPROM 4 at timing when startup of the EEPROM 4 becomes necessary. And, when operations of the EEPROM 4 become unnecessary, supplying of the second power supply voltage Vn to the EEPROM 4 is stopped promptly. The same goes for the flash ROM 5. The second power supply voltage Vn is supplied when the flash ROM 5 needs operating, and supplying of the second power supply voltage Vn is stopped promptly when the flash ROM 5 does not need operating. In this way, in the present embodiment, the supply destination of the second power supply voltage Vn is controlled appropriately based on a progress status of NFC communication or serial communication.

Further, as described above, NFC communication and serial communication can be performed even at power-off time. Hence, firmware can be updated even at power-off time. That is, while suppressing the consumption amount of electric power received from the smartphone 100, a process of inquiring whether firmware update is needed and a process based on the inquiring process can be performed. Also, merely by starting up a firmware update application on the smartphone 100, downloading firmware data, and then holding the smartphone 100 near the multifunction peripheral 1, firmware update can be performed automatically. Thus, firmware update can be performed easily even when the multifunction peripheral 1 is stored in a package or when a power plug is pulled out, for example.

The NFC-IC 3 determines whether firmware update is needed, based on the usage status of a user. Specifically, the NFC-IC 3 determines whether firmware update is needed, based on relationship between firmware header information indicative of contents of firmware update and setting environmental data stored in the EEPROM 4.

If there is no relationship between the firmware header information and the setting environmental data (or a low degree of relationship), it is not so necessary for the user of the multifunction peripheral 1 to update firmware. If firmware is updated uniformly in such cases, it substantially leads to waste of power consumption.

In contrast, the multifunction peripheral 1 in the present embodiment determines whether update is needed, based on the usage status of a user, thereby feeding power sequentially to the EEPROM 4 and the flash ROM 5 to perform firmware update when update is really necessary for the user of the multifunction peripheral 1. This can suppress an updating process that is not necessarily needed for the user (and hence wasteful supplying of the second power supply voltage Vn), and reduce the amount of power consumption more effectively at power-off time of the main body.

If it is determined that firmware update is not needed, the NFC-IC 3 transmits an update unnecessary notification to the smartphone 100. Hence, the user of the smartphone 100 can recognize that it is determined in the multifunction peripheral 1 that firmware update is not needed. Further, even when it is determined in the multifunction peripheral 1 that firmware update is not needed, the user of the smartphone 100 can forcefully update firmware if he or she desires to do so.

Further, the NFC-IC 3 transmits, to the smartphone 100, an inquiry of whether to delete firmware data stored temporarily in the memory 21b, after firmware is updated or after it is determined that firmware update is not needed. And, if a deletion command is received from the smartphone 100, the firmware data in the memory 21b is deleted. In this way, since contents stored in the memory 21b can be deleted in accordance with the user's demand, the memory 21b can be utilized efficiently.

Further, if the power supply circuit 9 starts up during NFC communication with the smartphone 100, the first power supply voltage Vcc is supplied and the main controller 11 of the control circuit 2 starts up. In this case, the OFF state of the cutoff switch 20 is maintained, and an access from the control circuit 2 to other targets of serial communication through the serial line L is cut off.

Assuming that the cutoff switch 20 does not exist, even while the control circuit 2 stops operations, data of serial communication between the NFC communicator 3 and the other communication nodes are inputted to the serial port 13 of the control circuit 2 (that is, an electrical change in the serial line L is inputted). If an electric potential of the serial port 13 changes despite a fact that the control circuit 2 is in a stopped state, there may be an adverse effect on an internal circuit of the control circuit 2. Further, if the control circuit 2 starts up while the NFC communicator 3 is performing serial communication with another communication node, a plurality of masters exists, and data conflict (collision) of the plurality of masters occurs.

In contrast, the multifunction peripheral 1 in the present embodiment has the cutoff switch 20 on the serial line L, and the control circuit 2 appropriately controls ON and OFF of the cutoff switch 20. In addition, the cutoff switch 20 in the present embodiment is a switch of a normally open type. Hence, occurrence of the above-described problem can be suppressed.

Thus, according to the multifunction peripheral 1 in the present embodiment, even when the power supply circuit 9 stops operations, an access (especially, an access to the communication nodes such as the EEPROM 4 and the flash ROM 5) can be gained successfully from an external communication device (the smartphone 100) to the multifunction peripheral 1 by NFC communication, while suppressing the amount of power feeding from the smartphone 100. And, even if the power supply circuit 9 is started up while NFC communication is being performed, the cutoff switch 20 is maintained in an OFF state at least while the NFC communication is being performed. Hence, the NFC communicator 3 can successfully continue NFC communication that is being performed.

Although the OFF state of the cutoff switch 20 is maintained at startup of the control circuit 2, when the smartphone 100 is separated from the multifunction peripheral 1, the cutoff switch 20 is turned on and the NFC communicator 3 is switched to the slave. Hence, as soon as the need for maintaining the OFF state of the cutoff switch 20 is eliminated, the control circuit 2 quickly starts serial communication with other communication nodes.

Further, while the smartphone 100 is held near the multifunction peripheral 1, the NFC communicator 3 continues generating interrupts to the control circuit 2. Thus, at startup of the control circuit 2, the control circuit 2 can determine easily and appropriately whether the NFC communicator 3 is currently performing NFC communication or whether the NFC communicator 3 is in a state where there is possibility that NFC communication is performed. And, based on the determination result, the cutoff switch 20 can be controlled appropriately.

In the present embodiment, the power supply circuit 9 serves as an example of a first power supply. The power feeding circuit 24 serves as an example of a second power supply. The main controller 11 serves as an example of a main controller. The memory 21b in the NFC-IC 3 serves as an example of a memory (storage section). The EEPROM 4 and the flash ROM 5 serve as an example of a communication node. The firmware data is an example of latest main information (particular firmware). The firmware header information is an example of latest-main-information related information (characteristic information). The setting environmental data is an example of process-request information (user-usage-status information).

Second Embodiment

Figure 7:
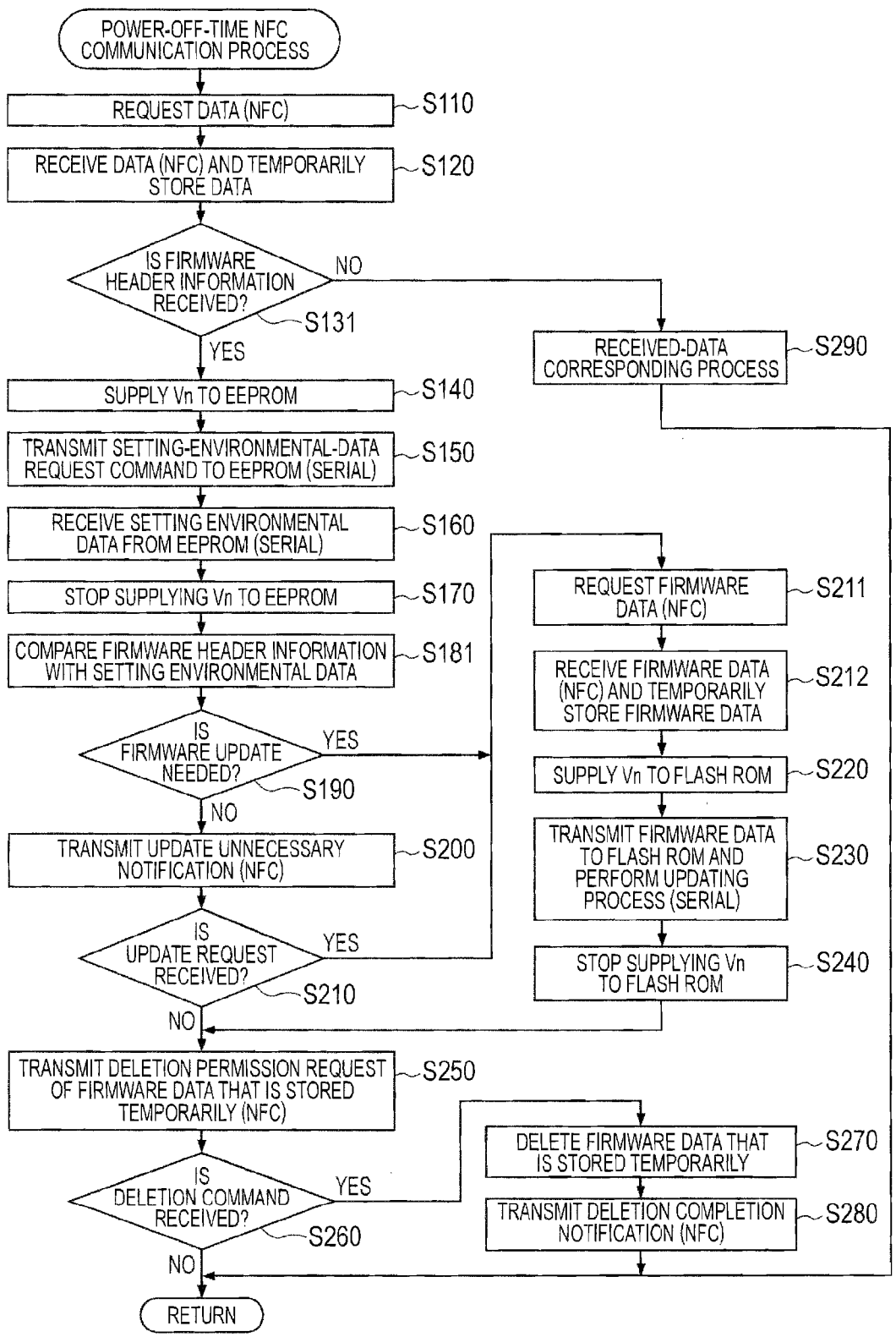
FIG. 7 is a flowchart showing a power-off-time NFC communication process according to a second embodiment.

A power-off-time NFC communication process according to a second embodiment will be described while referring to FIG. 7. FIG. 7 is another example of the power-off-time NFC communication process of the first embodiment shown in FIG. 6. FIG. 7 is a flowchart showing the power-off-time NFC communication process of the second embodiment.

When the power-off-time NFC communication process of the second embodiment shown in FIG. 7 is compared with the power-off-time NFC communication process of the first embodiment shown in FIG. 6, although several processes are different, there are many common processes. Thus, in FIG. 7, the same processes as those in FIG. 6 are designated by the same reference numerals to avoid duplicating description.

In the second embodiment, it is assumed that a firmware update application of the smartphone 100 differs from that of the first embodiment. The firmware update application of the first embodiment transmits entire firmware data to the multifunction peripheral 1, in response to a data request from the multifunction peripheral 1. In contrast, the firmware update application of the second embodiment does not transmit entire firmware data but transmits only firmware header information, in response to a data request from the multifunction peripheral 1. Subsequently, upon receiving a request for firmware data from the multifunction peripheral 1, the firmware update application of the second embodiment transmits firmware data to the multifunction peripheral 1.

After starting the power-off-time NFC communication process of the second embodiment shown in FIG. 7, in S120 the CPU 21a of the NFC-IC 3 receives data from the smartphone 100 and temporarily stores the data in the memory 21b, and executes a process of S131. In S131, the CPU 21a determines whether data received from the smartphone 100 is firmware header information. If the received data is not firmware header information (S131: NO), the process advances to S290. If the received data is firmware header information (S131: YES), the process advances to S140.

In S160 the CPU 21a receives setting environmental data from the EEPROM 4, and in S170 stops power feeding to the EEPROM 4. After that, in S181 the CPU 21a determines whether firmware update is needed based on comparison between the firmware header information and the setting environmental data. Note that, in S180 of FIG. 6 too, the CPU 21a substantially determines whether firmware update is needed based on comparison between the firmware header information and the setting environmental data. Hence, the determining process of S181 is substantially the same as S180 of FIG. 6.

If the CPU 21a determines in S190 that update of the firmware is needed (S190: YES), or determines in S210 that an update request is received (S210: YES), the process advances to S211.

In S211, the CPU 21a sends a request for firmware data to the smartphone 100 by NFC communication. Upon receiving this request, the smartphone 100 transmits firmware data to the multifunction peripheral 1. In S212, the CPU 21a receives firmware data transmitted from the smartphone 100, and temporarily stores the firmware data in the memory 21b. After receiving firmware data in this way, the CPU 21a advances to the processes in S220 and thereafter (transmission of firmware data to the flash ROM 5, and so on).

Note that the smartphone 100 may preliminarily download the entire firmware data from a server before firmware data is requested by the multifunction peripheral 1. Or, the smartphone 100 may download only necessary information such as the firmware header information from the server and, when firmware data is requested by the multifunction peripheral 1, may download the entire firmware data from the server and transmit the downloaded data to the multifunction peripheral 1.

As described above, the entire firmware data is received from the smartphone 100 when it is determined that firmware update is needed. This reduces the amount of communication of NFC communication with the smartphone 100, and reduces frequency of usage of the memory 21b.

Third Embodiment

Figure 8:
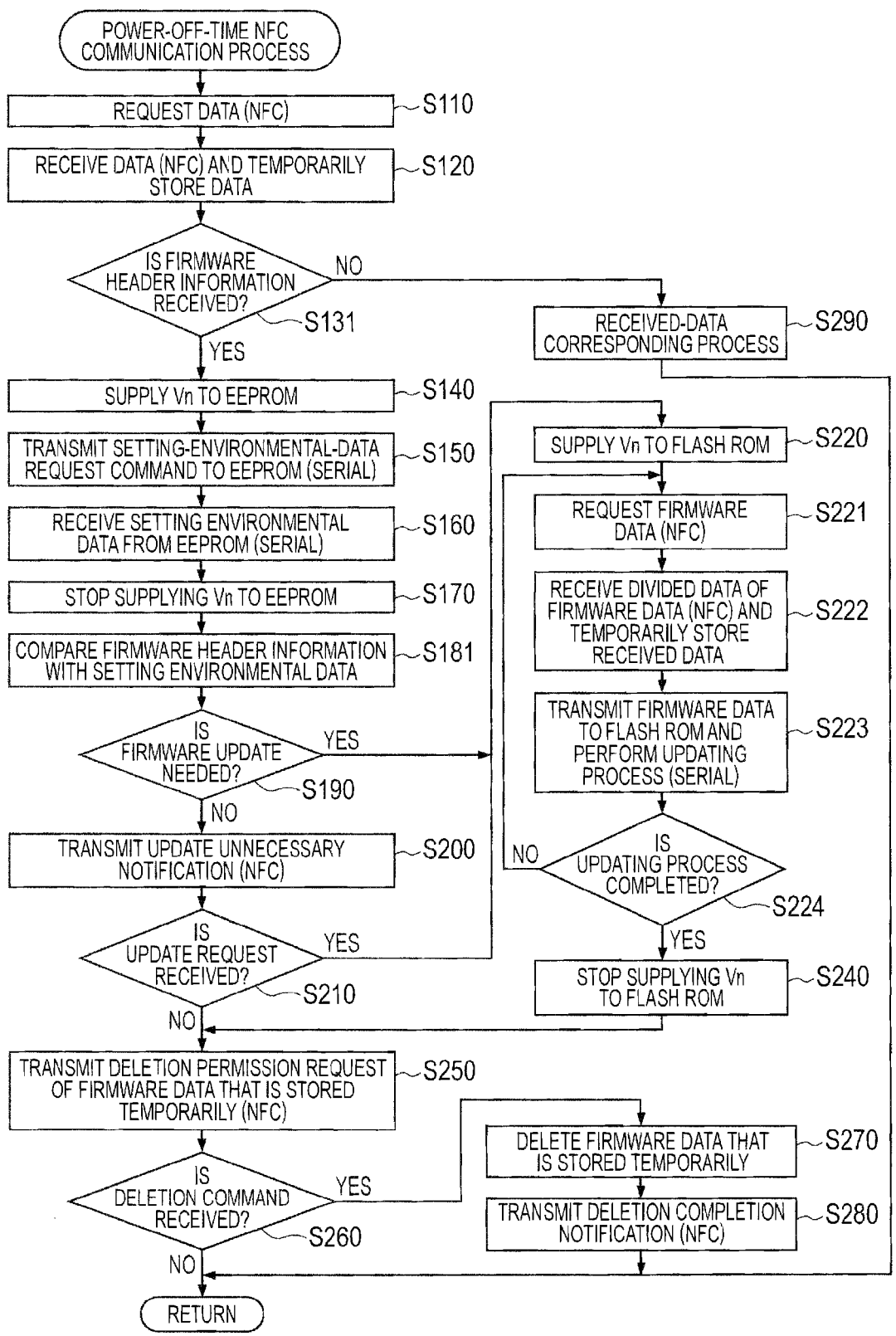
FIG. 8 is a flowchart showing a power-off-time NFC communication process according to a third embodiment.

A power-off-time NFC communication process according to a third embodiment will be described while referring to FIG. 8. FIG. 8 is another example of the power-off-time NFC communication process of the first embodiment shown in FIG. 6. FIG. 8 is a flowchart showing the power-off-time NFC communication process of the third embodiment.

When the power-off-time NFC communication process of the third embodiment shown in FIG. 8 is compared with the power-off-time NFC communication process of the first embodiment shown in FIG. 6, although several processes are different, there are many common processes. Thus, in FIG. 8, the same processes as those in FIG. 6 are designated by the same reference numerals to avoid duplicating description. Further, in the power-off-time NFC communication process of the third embodiment shown in FIG. 8, the processes of S131 and S181 are the same as the processes of S131 and S181 in the power-off-time NFC communication process of the second embodiment shown in FIG. 7. Thus, in the power-off-time NFC communication process of the third embodiment shown in FIG. 8, the same processes as those in FIGS. 6 and 7 are designated by the same reference numerals to avoid duplicating description. Only the processes different from those in FIGS. 6 and 7 (that is, the processes of S220 to S240) will be described.

In the third embodiment, it is assumed that a firmware update application of the smartphone 100 differs from that of the second embodiment. The firmware update application of the second embodiment transmits the entire firmware data to the multifunction peripheral 1, in response to a firmware data request from the multifunction peripheral 1. In contrast, in response to a firmware data request from the multifunction peripheral 1, the firmware update application of the third embodiment does not transmit the entire firmware data, but divides the entire firmware data into a plurality of data blocks and transmits the divided data blocks (hereinafter referred to as "divided data") one at a time sequentially to the multifunction peripheral 1. Specifically, each time one divided data is transmitted, the smartphone 100 waits for a firmware data request to be received again from the multifunction peripheral 1. When the firmware data request is received, the smartphone 100 transmits the next one of divided data.

After starting the power-off-time NFC communication process of the third embodiment shown in FIG. 8, if the CPU 21a of the NFC-IC 3 determines in S190 that update of the firmware is needed (S190: YES) or determines in S210 that an update request is received (S210: YES), the process advances to S220. In S220, the CPU 21a supplies the second power supply voltage Vn from the second power feeding port 32 to the flash ROM 5.

After the process of S220, in S221 the CPU 21a sends a request for firmware data to the smartphone 100 by NFC communication. Upon receiving this request, the smartphone 100 transmits one divided data of firmware data to the multifunction peripheral 1. In S222, the CPU 21a receives the divided data of the firmware data transmitted from the smartphone 100, and temporarily stores the received data in the memory 21b.

In S223, the CPU 21a transmits, to the flash ROM 5, the divided data stored temporarily in S222, and updates firmware in the flash ROM 5. If an updating process cannot be performed by using only the divided data transmitted to the flash ROM 5, the updating process is deferred until the next divided data is transmitted.

In S224, the CPU 21a determines whether the updating process of firmware is completed. If the updating process of firmware is completed, all the divided data are received. On the other hand, if the updating process of firmware is not completed, all the divided data are not yet received.

Hence, if it is determined in S224 that the updating process is not completed (S224: NO), the CPU 21a returns to S221 and requests firmware data. If it is determined in S224 that the updating process is completed (S224: YES), the process advances to S240.

Note that, similar to the second embodiment, the smartphone 100 may download firmware data from the server at timing when firmware data is requested by the multifunction peripheral 1. In that case, every time a firmware data request is received from the multifunction peripheral 1, the smartphone 100 may download one divided data at a time from the server and transmit the one divided data to the multifunction peripheral 1, not downloading the entire firmware data from the server as a whole.

[Modifications]

(1) As a method of determining whether a firmware update is needed, in the above-described embodiment, relationship between firmware header information and setting environmental data is determined. However, this determination method is just an example, and another method may be adopted. For example, versions of firmware may be simply compared and, if the version of firmware stored in the flash ROM 5 is older, the firmware may be updated.

(2) As a method of updating firmware, instead of receiving the entire firmware data (a program of the latest version of firmware) and updating firmware, updating may be performed by using an update program only including programs and data needed for updating (an example of update information). The update program is a program for updating a part of the program that is already stored, thereby eventually updating the entire firmware to a state of the latest version.

(3) In the above-described embodiment, the EEPROM 4 and the flash ROM 5 are shown as the communication node that serves as the slave, other than the NFC-IC 3. These are merely one example. The kind and the number of communication nodes are not limited to a specific kind and number. Further, it is not always necessary to supply all of these communication nodes with the second power supply voltage Vn. For example, the apparatus may be so configured that the second power supply voltage Vn is supplied to a communication node that needs to perform serial communication even in a main power OFF state, and that the second power supply voltage Vn is not supplied to a communication node that does not need to perform serial communication in the main power OFF state.

Further, if the second power supply voltage Vn is supplied from the NFC-IC 3 to N communication nodes (N is a number larger than or equal to three), supplying of the second power supply voltage Vn to each of N communication nodes may be controlled individually. Or, supplying and stopping of the second power supply voltage Vn may be performed concurrently for two or more (smaller than N) communication nodes out of the N communication nodes.

(4) In the above-described embodiment, as a data communication method between communication nodes, serial communication of the master-slave method is illustrated as an example. However, the invention is neither limited to the master-slave method, nor to serial communication.

(5) In the above-described embodiment, the smartphone 100 is illustrated as an example of an external device that can perform NFC communication with the multifunction peripheral 1. However, another external device other than the smartphone 100 (an external device having a NFC communication function) could perform NFC communication with the multifunction peripheral 1, like the smartphone 100 does.

(6) While the invention has been described in detail with reference to the above aspects thereof, it would be apparent to those skilled in the art that various changes and modifications may be made therein without departing from the scope of the claims. For example, a part of the configuration in the above-described embodiment may be replaced with a known configuration having a similar function, may be added to or replaced with a configuration in other embodiments, or may be omitted as long as technical problem can be solved. Further, the above-described plurality of embodiments may be combined appropriately.

What is claimed is:

1. A communication apparatus comprising:
a first power supply configured to generate first power;
an antenna configured to perform non-contact communication with an external device;
a second power supply configured to generate second power based on electric power supplied from the external device via the antenna;
a communication controller configured to control non-contact communication with the external device via the antenna while at least one of the first power and the second power is supplied to the communication controller, the communication controller having a memory;
a main controller configured to control the communication apparatus to perform a function thereof while the first power is supplied to the main controller; and
a plurality of communication nodes configured to operate while at least one of the first power and the second power is supplied to the plurality of communication node, the plurality of communication nodes including a first communication node and a second communication node,
wherein, in a state where the first power is not supplied to the communication controller and the second power is supplied to the communication controller, the communication controller is configured to perform:
a receiving process of receiving process-request information from the external device;
a storing process of, in response to receiving the process-request information from the external device, storing at least part of the process-request information in the memory;
a first supplying process of controlling the second power supply to supply the second power to the first communication node;
a first data communication process of performing data communication with the first communication node after starting the first supplying process, wherein the first data communication process includes receiving process-related information from the first communication node;
a first stopping process of controlling the second power supply to stop supplying of the second power to the first communication node after finishing the first data communication process;
a determining process of, after finishing the first stopping process, determining whether data communication with the second communication node is necessary, based on the process-request information and on the process-related information;
a second supplying process of controlling the second power supply to supply the second power to the second communication node, in response to determining in the determining process that data communication with the second communication node is necessary;

a second data communication process of performing data communication with the second communication node after starting the second supplying process; and a second stopping process of controlling the second power supply to stop supplying of the second power to the second communication node after finishing the second data communication process.

2. The communication apparatus according to claim 1, wherein each of the first communication node and the second communication node is configured to store information;

wherein the second communication node is configured to store main information;

wherein the first communication node is configured to store the process-related information that is related to the main information;

wherein the process-request information sent from the external device includes at least one of latest main information that is a latest version of the main information at a particular time, update information needed for updating the main information to the latest main information, and latest-main-information related information indicative of a content of the latest main information;

wherein the determining process is a process of determining whether it is necessary to perform an updating process of storing the latest main information in the second communication node, and of determining that data communication with the second communication node is necessary in a case that the updating process is necessary; and wherein the second data communication process is a process of transmitting at least one of the latest main information and the update information to the second communication node.

3. The communication apparatus according to claim 2, wherein the second communication node is configured to perform the updating process based on information received in the second data communication process.

4. The communication apparatus according to claim 2, wherein the main information is firmware that is a program for controlling the communication apparatus;

wherein the latest main information is particular firmware that is the firmware of a particular version; and wherein the latest-main-information related information is characteristic information indicative of a characteristic of the particular firmware.

5. The communication apparatus according to claim 4, wherein the process-related information is user-usage-status information indicative of a usage status of a function of the communication apparatus by a user of the communication apparatus; and wherein, in the determining process, the communication controller is configured to determine that the updating process is necessary in a case that the process-request information and the user-usage-status information have a particular relationship.

6. The communication apparatus according to claim 2, wherein, in response to determining in the determining process that data communication with the second communication node is unnecessary, the communication controller is configured to perform a notifying process of notifying the external device, by the non-contact communication, that the second data communication process is not performed.

7. The communication apparatus according to claim 6, wherein, in response to receiving, after performing the notifying process, a request for performing the second data communication process from the external device by the non-contact communication, the communication controller is configured to perform the second supplying process and the second data communication process regardless of a result of the determining process.

8. The communication apparatus according to claim 1, wherein the communication controller is configured to perform:

a deletion inquiring process of, in response to not performing the second data communication process, transmitting, to the external device, an inquiry about whether to delete information stored in the memory by the storing process; and a deleting process of deleting the information stored in the memory by the storing process, in response to receiving a command to delete the information from the external device as a result of the deletion inquiring process.

9. The communication apparatus according to claim 1, wherein the communication controller is configured to control the second power supply to change the supply target of the second power, such that the second power is supplied only to the first communication node, that the second power is supplied only to the second communication node, and that the second power is supplied to both the first communication node and the second communication node.

10. The communication apparatus according to claim 1, further comprising:

a communication line configured to connect the communication controller, the main controller, and the plurality of communication nodes with one another, such that the communication controller, the main controller, and the plurality of communication nodes perform data communication with one another in a particular data communication method; and a switch provided on the communication line and configured to cut off data communication between the main controller and other data communication targets, wherein the main controller is configured to control the switch to cut off the communication line in a case that data communication is performed between the communication controller and at least one of the plurality of communication nodes at startup of the main controller.

11. The communication apparatus according to claim 10, wherein, in a case that the main controller determines that data communication is performed between the communication controller and the at least one of the plurality of communication nodes at startup of the main controller, the main controller is configured to control the switch to cut off the communication line; and wherein, after the data communication is finished between the communication controller and the at least one of the plurality of communication nodes, the main controller is configured to control the switch to cancel a cutoff state of the communication line.

12. The communication apparatus according to claim 10, wherein the switch is configured to maintain a cutoff state of the communication line while the main controller stops operating without supply of the first power.

13. The communication apparatus according to claim 10, wherein, while performing data communication with at least one of the plurality of communication nodes by the particular data communication method, the communication controller is configured to output communication-performing information indicating that data communication is currently performed; and wherein the main controller is configured to control the switch to cut off the communication line, in a case that the communication-performing information is outputted from the communication controller at the startup of the main controller.

14. The communication apparatus according to claim 10, wherein the particular data communication method is a master-slave data communication method; and
wherein, in a case that the communication controller operates by receiving supply of the first power and starts data communication, the communication controller is configured to operate as slave in the particular data communication method; and
wherein, in a case that the communication controller operates by receiving supply of the second power and starts data communication without supply of the first power, the communication controller is configured to operate as master in the particular data communication method.

15. The communication apparatus according to claim 10, wherein at least one of the plurality of communication nodes comprises a memory configured to store data,
wherein the memory is configured to store at least one of data that is needed for the main controller to control execution of the function of the communication apparatus and data that is generated as a result of the main controller's controlling execution of the function of the communication apparatus; and
wherein, in response to supplying of the second power from the second power supply to the communication controller and the plurality of communication nodes when the first power is not generated by the first power supply, the communication controller is configured to perform at least one of reading of data stored in the memory and writing of data to the memory by performing data communication with at least one of the plurality of communication nodes based on the non-contact communication with the external device.

16. The communication apparatus according to claim 1, further comprising an image forming device configured to form an image,
wherein the second communication node is configured to store firmware data;
wherein the first communication node is configured to store setting environmental data that reflects a usage state of a user of the communication apparatus, the setting environmental data being the process-related information; and
wherein the setting environmental data includes at least one of a number of printing times for each kind of printing paper, a number of printing times for each color mode, setting information of wireless LAN, and setting information of favorite buttons.

17. The communication apparatus according to claim 16, wherein the process-request information includes firmware header information; and
wherein the determining process comprises:
in response to determining that the update indicated by the firmware header information includes a content having relationship or having a high degree of relationship with the setting environmental data, determining that the update of the firmware data is necessary; and
in response to determining that the update indicated by the firmware header information does not include a content having relationship with the setting environmental data or that the update only includes a content having a low degree of relationship with the setting environmental data, determining that the update of the firmware data is unnecessary.

18. The communication apparatus according to claim 17, wherein, in response to determining that the update of the firmware data is unnecessary, the communication controller is configured to further perform:
transmitting an update unnecessary notification to the external device by non-contact communication, the update unnecessary notification being a notification indicating that the update of the firmware data is unnecessary;
determining whether an update request is received from the external device in response to the update unnecessary notification; and
in response to determining that the update request is received from the external device, executing the second supplying process, the second data communication process, and the second stopping process.

19. The communication apparatus according to claim 1, wherein the second power supply has a first power feeding port and a second power feeding port each configured to output the second power;
wherein the first communication node has a first power input port, and the second communication node has a second power input port;
wherein the first power input port is connected to the first power feeding port via a first supply route, and the second power input port is connected to the second power feeding port via a second supply route;
wherein the first power input port is connected to the first power supply and the main controller via a third supply route, and the second power input port is connected to the first power supply and the main controller via a fourth supply route;
wherein the third supply route has a first diode configured to prevent the second power outputted from the first power feeding port from being supplied, through the third supply route, to the first power supply and the main controller; and
wherein the fourth supply route has a second diode configured to prevent the second power outputted from the second power feeding port from being supplied, through the fourth supply route, to the first power supply and the main controller.

20. The communication apparatus according to claim 1, wherein the first communication node comprises an EEPROM and the second communication node comprises a flash ROM.

* * * * *